May 29, 1928.
E. E. BOWERS
1,671,694
CORN SEED SEVERING IMPLEMENT
Filed Dec. 7, 1927
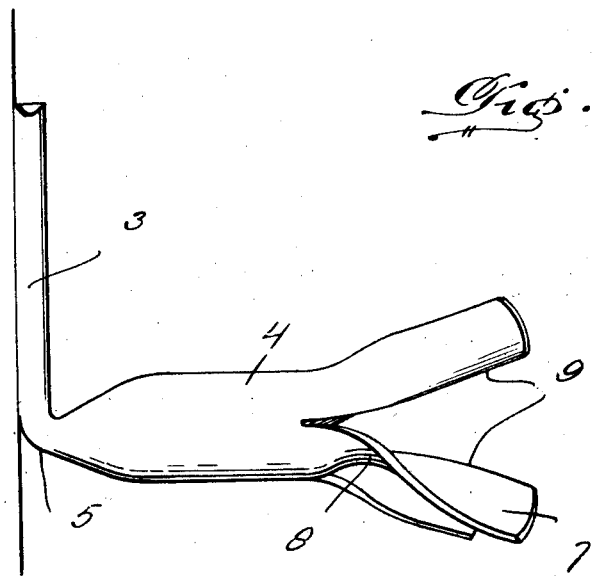
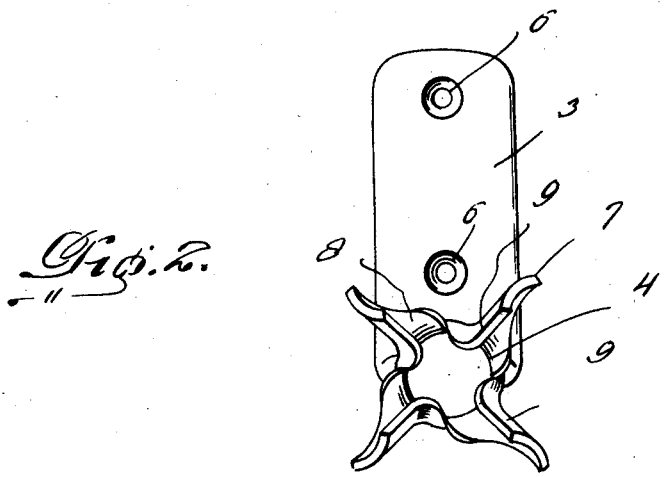
Inventor
E. E. Bowers
By Clarence A. O'Brien
Attorney Patented May 29, 1928.

UNITED STATES PATENT OFFICE.

EARL E. BOWERS, OF SHICKLEY, NEBRASKA.

CORN-SEED-SEVERING IMPLEMENT.

Application filed December 7, 1927. Serial No. 238,336.

This invention relates to an improved product of manufacture, whose use permits it to be briefly entitled a corn seed severing implement, such as is known sometimes as a corn tipper and butter.

The invention has more particular reference to a device of this kind which is adapted to be fastened to a suitable stationary support, and which is constructed to provide a plurality of cutting edges whose relationship is such as to permit them to function in an efficient manner for severing and cutting the small and undesirable kernels from the cob.

My principal aim is to provide a simple and inexpensive device wherein the cutting means is so disposed as to permit the butts and tips of the corn to be inserted between the cutters, and rotated to remove the undeveloped kernels so that the properly developed kernels can be subsequently shelled in the usual way in order to insure obtaining the best kernels for seeds.

Other features and advantages of the invention will become more readily apparent from the following description and drawings.

In the drawings:—

Figure 1 is a side elevational view of an implement constructed in accordance with the invention.

Fig. 2 is a front elevation of the same.

In carrying out the invention, I utilize a short length of pipe of an appropriate size. One end of the pipe is flattened as at 3, and bent at right angles to the body portion 4, as at 5. This flattened portion is apertured at 6 to form what may be conveniently referred to as an attaching bracket. This is supposed to be fastened to the wall of some suitable rigid support. The outer end of the body portion 4 is slit longitudinally at circumferentially spaced points to provide a quartet of duplicate fingers 7.

These fingers are flexed longitudinally, so that the free end portions are directed outwardly and away from each other in outwardly flaring or divergent relationship. This flaring relationship of the fingers, facilitates placement of the ear of corn. These fingers are also twisted as at 8 with respect to the longitudinal axis of the body portion 4 and the degree of twist of each finger, is such as to dispose one longitudinal edge in position for acting on the kernels. With this arrangement, I provide a series of four cutting edges 9. Thus, we have outwardly flaring twisted cutting elements adapted for ready reception of an ear of corn.

With this device, the small end of the cob may be inserted first, and twisted so that the undeveloped kernels come in severing contact with the cutting edges. In this way, the undesirable kernels are cleanly severed from the cob. After the kernels on the small end of the cob, are thus removed, the cob is reversed and the butt end is inserted between the cutters and rotated in the same way to cut off any small and undesirable kernels on this end.

A careful consideration of the description in connection with the drawings, will permit a clear understanding of the construction, operation and efficiency to be understood. Therefore, a more lengthy description is believed unnecessary.

Changes in shape, size, and proportions, coming within the field of invention claimed, may be resorted to in actual practice.

Having thus described my invention, what I claim as new is:—

As a new product of manufacture, a corn cutting implement of the class described, comprising a short length of pipe having one end flattened and apertured and bent at right angles to provide an attaching bracket, the opposite end portion of the body being slit longitudinally at circumferentially spaced points and providing fingers which are flexed longitudinally into outwardly flaring divergent relationship, said fingers being twisted with respect to the device in a manner to dispose certain of the edges in position to provide cutting edges.

In testimony whereof I affix my signature.

EARL E. BOWERS.